(12) United States Patent
Hoffman

(10) Patent No.: US 6,623,062 B1
(45) Date of Patent: Sep. 23, 2003

(54) POWER TONNEAU COVER ACTUATOR

(76) Inventor: Drew Hoffman, 877 SW. Summit View Dr., Portland, OR (US) 97201

( * ) Notice: Subject to any disclaimer, the term of this patent is extended or adjusted under 35 U.S.C. 154(b) by 0 days.

(21) Appl. No.: 10/251,358

(22) Filed: Sep. 20, 2002

(51) Int. Cl.[7] .................................................. B60P 7/02
(52) U.S. Cl. ............................. 296/100.1; 296/100.09; 296/100.03; 296/100.06
(58) Field of Search ......................... 296/100.1, 100.18, 296/165, 100.16, 37.6, 100.06, 100.12, 100.17, 100.02, 100.07, 100.01

(56) References Cited

U.S. PATENT DOCUMENTS

| | | | | |
|---|---|---|---|---|
| 2,989,340 A | * | 2/1961 | Penner ..................... | 296/100.1 |
| 3,762,762 A | * | 10/1973 | Beveridge et al. ........ | 296/100.1 |
| 3,785,698 A | * | 1/1974 | Dean et al. .............. | 296/100.1 |
| 4,101,162 A | * | 7/1978 | Koehn ..................... | 296/100.1 |
| 4,522,440 A | * | 6/1985 | Gostomski ............... | 296/100.1 |
| 4,756,571 A | * | 7/1988 | Lake ....................... | 296/100.1 |
| 5,011,214 A | * | 4/1991 | Friesen et al. .......... | 296/100.09 |
| 5,104,175 A | * | 4/1992 | Enninga .................. | 296/100.1 |
| 5,203,364 A | * | 4/1993 | Koole ..................... | 296/100.1 |
| 5,909,921 A | * | 6/1999 | Nesbeth ................... | 296/100.1 |
| 5,971,446 A | * | 10/1999 | Lunney, II ............... | 296/100.1 |
| 5,988,728 A | * | 11/1999 | Lund et al. ............. | 296/100.03 |
| 6,186,576 B1 | * | 2/2001 | Kepley et al. ........... | 296/100.1 |
| 6,217,102 B1 | * | 4/2001 | Lathers ................... | 296/100.1 |
| 6,234,559 B1 | * | 5/2001 | Block et al. ............ | 296/100.06 |
| 6,309,005 B1 | * | 10/2001 | Priest et al. ........... | 296/100.06 |
| 6,340,194 B1 | * | 1/2002 | Muirhead et al. ........ | 296/100.1 |
| 6,382,700 B2 | * | 5/2002 | Young et al. ............ | 296/100.1 |
| 6,520,558 B1 | * | 2/2003 | Katterloher et al. ..... | 296/100.06 |
| 2001/0038225 A1 | * | 11/2001 | Muirhead ................ | 296/100.1 |

* cited by examiner

*Primary Examiner*—Kiran Patel
(74) *Attorney, Agent, or Firm*—Paul J. Fordenbacher; Schwabe Williamson & Wyatt

(57) ABSTRACT

The present invention provides a power assisted cover actuator for operating a tonneau cover for an open bed of a truck, such as a pickup truck. A common truck bed cover includes, but is not limited to, a fiberglass panel that overlies the truck bed. The cover is typically hingably coupled to a distal end of the truck bed adjacent the truck cab. The power assisted cover actuator in accordance with an embodiment of the present invention comprises a linear track upon which a trolley is guided. One end of an actuator arm is pivotally coupled to the trolley. The power assisted cover actuator is secured to the inside surface of a side wall of the truck bed proximal to the opening end of the cover and distal to the hinge coupling. The linear track is positioned at an angle to the horizontal extending in an upward direction towards the hinged coupling. The other end of the actuator arm is pivotally coupled to the inside of the cover. A drive means for translating the trolley along the linear track is provided. The drive means advances the trolley along the linear track from a lower position to a higher position which raises the arm to push the cover open. Reversing the direction of travel of the trolley from a higher position to a lower position lowers the arm and closes the cover.

9 Claims, 5 Drawing Sheets

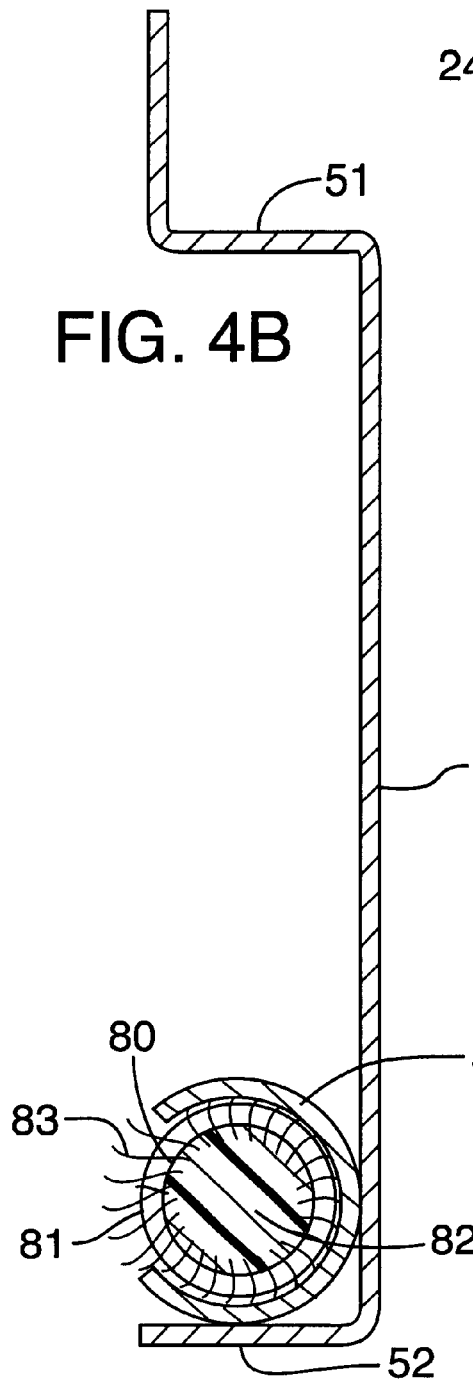
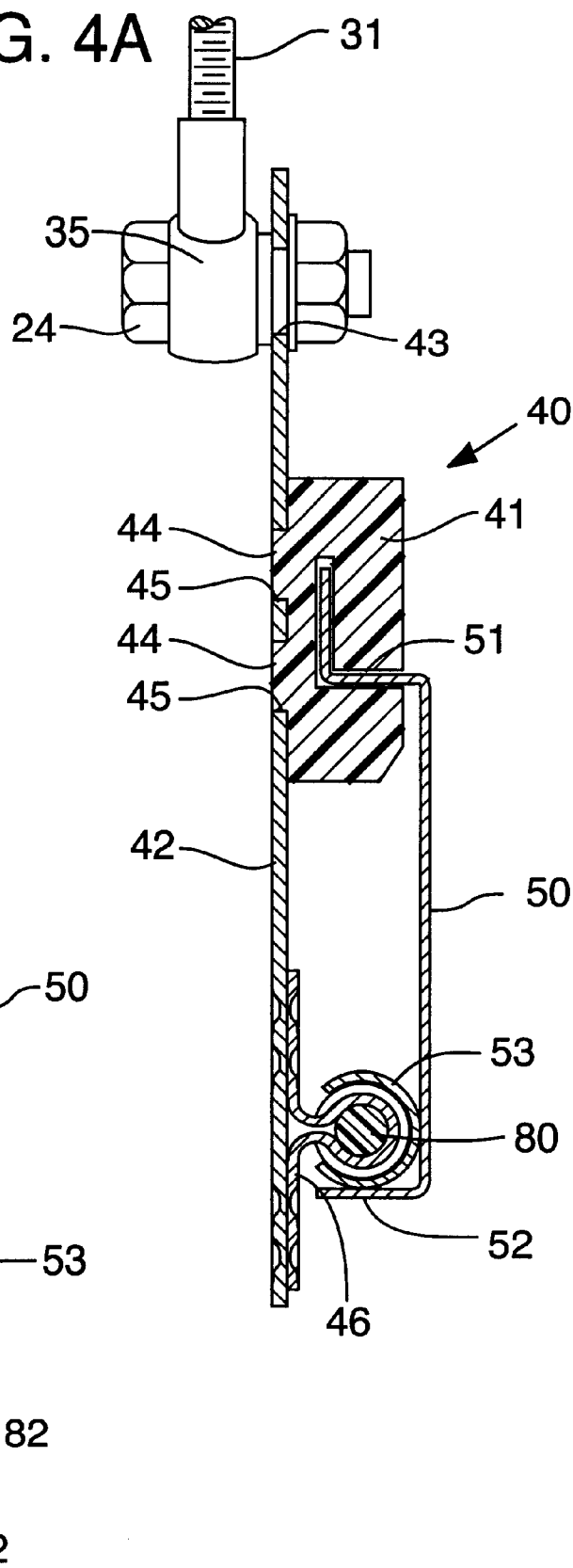

POWER TONNEAU COVER ACTUATOR

FIELD OF THE INVENTION

This invention generally relates to hard tonneau covers for pickup truck beds, and more particularly, the mechanisms and hardware for a powered assisted cover actuator.

BACKGROUND OF INVENTION

Pickup truck beds are commonly covered with a rigid cover to protect cargo within the bed. These covers are hinged at one end of the truck bed, typically adjacent the truck cab. The bed is accessed by lifting the cover up from the end opposite the hinge, and typically, adjacent the tailgate. These covers can be heavy and rather awkward to open by hand. Additionally, it is difficult for the user to open the cover with one hand and service the bed with the other.

Some devices are available to assist in the use of the covers. One type of device provides a rigid rod for propping open the cover, much like how the hood of a car is propped open. Another type of device includes gas struts that support the cover in an open position. While somewhat satisfactory for holding the cover open while loading and unloading, props and gas struts do not assist with the opening of the cover.

Powered covers have been disclosed in the past. By example, U.S. Pat. No. 3,155,423 discloses a liftable vehicle top for a pickup truck issued to Cripe in 1964. Other truck cover devices include a foldable top for a truck bed issued to Geier in U.S. Pat. No. 4,964,669. These truck bed covers and others like them incorporate rather complex structures on both sides of the cover that lift the cover upwards. The mechanisms for lifting the cover incorporates many moving parts, some including pivoting cross-arms and scissor linkages that not only obstruct access to the bed from the side, but present a safety hazard during the opening and closing of the cover.

Accordingly, there is a need for a power assisted truck bed cover actuator to automate the opening and closing of the cover to free the operator from manual operation. Further, there is a need for a power assisted cover actuator that is easily installed by the truck owner as well as the OEM. Also, there is a need for the added security measures afforded a power assisted cover actuator.

SUMMARY OF INVENTION

The present invention provides a power assisted cover actuator for operating a tonneau cover for an open bed of a truck, such as a pickup truck. A common truck bed cover includes, but is not limited to, a fiberglass panel that overlies the truck bed. The cover is typically hingably coupled to a distal end of the truck bed adjacent the truck cab. The power assisted cover actuator in accordance with an embodiment of the present invention comprises a linear track upon which a trolley is guided. One end of an actuator arm is pivotally coupled to the trolley. The power assisted cover actuator is secured to the inside surface of a side wall of the truck bed proximal to the opening end of the cover and distal to the hinge coupling. The linear track is positioned at an angle to the horizontal extending in an upward direction towards the hinged coupling. The other end of the actuator arm is pivotally coupled to the inside of the cover. A drive means for translating the trolley along the linear track is provided. The drive means advances the trolley along the linear track from a lower position to a higher position which raises the arm to push the cover open. Reversing the direction of travel of the trolley from a higher position to a lower position lowers the arm and closes the cover.

The power assisted cover actuator having a trolley adapted to translate on an inclined linear track carrying an end of the actuator arm provides a relatively simple mechanism allowing for the incorporation of a drive system to provide a power assisted cover actuator. Various types of drive means may be utilized that is suitable for the particular purpose, including, but not limited to electric motor and fluid hydraulic drive systems.

In one embodiment in accordance with the invention, the drive means is a gear-driven helical drive cable powered by an electric drive motor. The drive motor rotates a toothed gear that meshes with and advances the drive cable. The drive cable is coupled to the trolley and is adapted to advance the trolley along the track. The motor causes the gear to rotate in one direction to advance the trolley forward and up the inclined track raising the actuator arm and opening the cover. The motor causes the gear to rotate in the reverse direction to drive the trolley in the opposite direction lowering the arm and closing the cover.

In another embodiment in accordance with the invention, the drive means is a piston powered by a hydraulic drive system. The piston is coupled to the trolley and is adapted to advance the trolley along the track. The hydraulic drive system is pressurized to advance the piston from a retracted position to an extended position advancing the trolley up the inclined track raising the actuator arm and opening the cover. The hydraulic drive system is depressurized, retracting the piston and driving the trolley in the opposite direction lowering the arm and closing the cover.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentality's, procedures, and combinations particularly pointed out in the appended claims.

BRIEF DESCRIPTION OF DRAWINGS

FIGS. 4A and 4B are cross-sectional views of the track and trolley, in accordance with an embodiment of the invention.

DESCRIPTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

The present invention provides a power assisted cover actuator for operating a tonneau cover for an open bed of a truck, such as a pickup truck. A common truck bed cover includes, but is not limited to, a fiberglass panel that overlies the truck bed. The cover is typically hingably coupled to a distal end of the truck bed adjacent the truck cab. The power assisted cover actuator comprises a linear track upon which a trolley is guided. One end of an actuator arm is pivotally coupled to the trolley. The power assisted cover actuator is secured to the inside surface of a side wall of the truck bed proximal to the opening end of the cover and distal to the hinge coupling. The linear track is positioned at an angle to the horizontal extending in an upward direction towards the hinged coupling. The other end of the actuator arm is pivotally coupled to the inside of the cover. A powered means for translating the trolley along the linear track is provided. The means for translating the trolley advances the trolley along the linear track from a lower position to a higher position which raises the arm to push the cover open. Reversing the direction of travel of the trolley from a higher position to a lower position lowers the arm and closes the cover.

Figure 1:
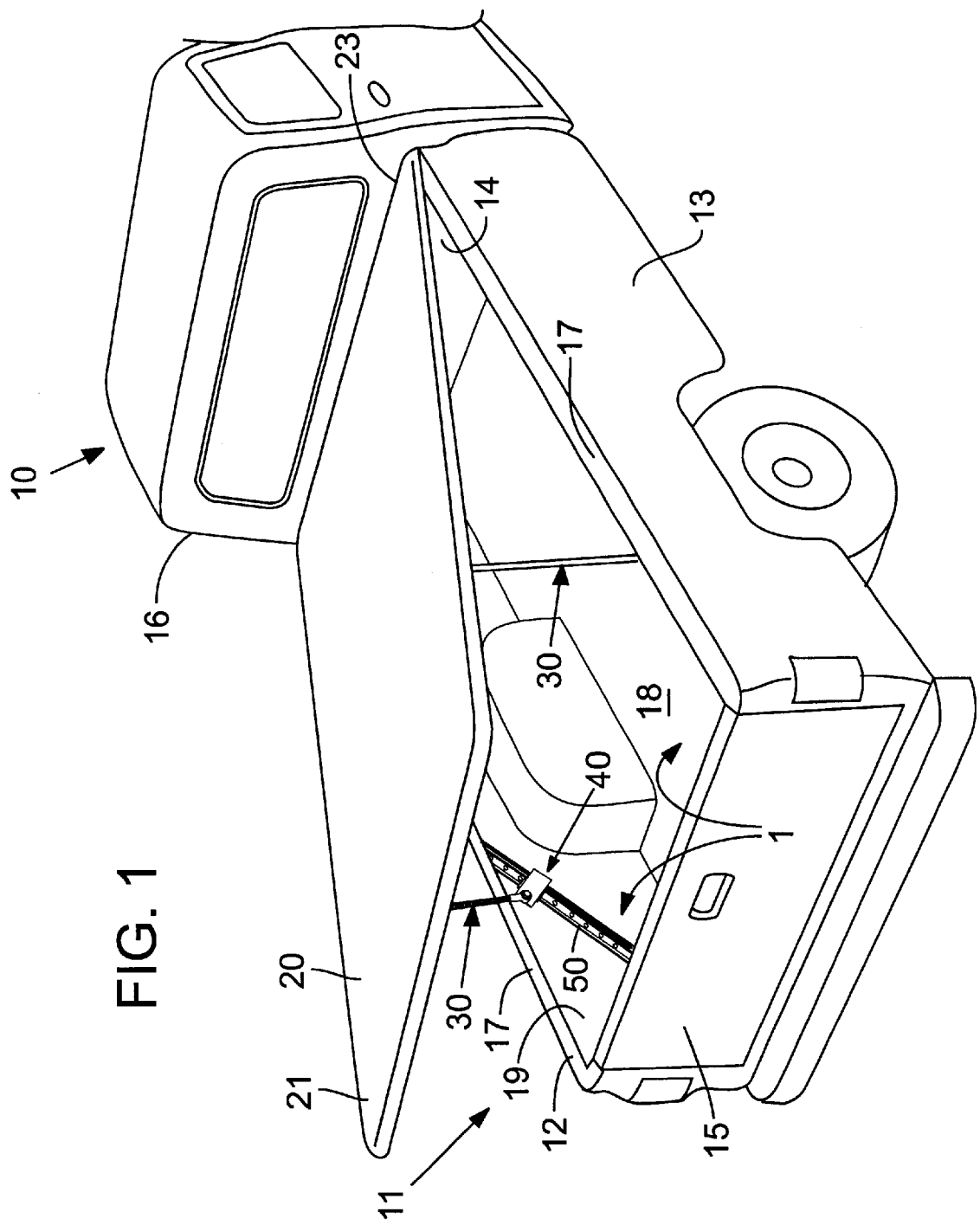
FIGS. 1 and 2 are rear perspective views of a motor-driven tonneau cover actuator mounted to a truck and a cover in accordance with an embodiment of the invention.

FIG. 1 is a rear perspective view of a pickup truck 10. A truck bed 11 is defined by a bed floor 18, upstanding opposite body side panels 12, 13, a tailgate 15, and a front panel 14 adjacent the driver's cab 16. The tonneau cover 20 comprises a one-piece molded fiberglass reinforced plastic panel that is sized to overlie the top rim 17 of the side panels 12, 13, front panel 14, and tailgate 15 so as to cover same when the cover 20 is in the lowered closed position. The cover 20 can be made of other materials such as, but not limited to, sheet metal.

In accordance with an embodiment of the present invention, a powered cover actuator 1 is mounted on the inside surface 19 of one of the side panels 12, 13 proximal to the opening end 21 of the cover 20 and distal to the hinge coupling 23. In another embodiment, one powered cover actuator 1 is used on each of the side panels 12, 13. The lift arm 30 is pivotally coupled to the trolley 40 at one end and pivotally coupled to the cover 20 at the other end. The cover actuator 1 opens the cover 20 in a manner to be raised above the bed 11 at the tailgate 15 to provide access to the tailgate 15 and sides 12, 13 of the truck bed 11 and to be lowered to a closed position enclosing the rim 17 of the bed 11.

The cover actuator 1 comprises a lift arm 30, a linear track 50, a trolley 40, and a drive means (not shown). The linear track 50 guides the movement of a trolley 40. The linear track 50 is positioned at an angle to the horizontal extending in an upward direction towards the hinged coupling 23. The drive means advances the trolley 40 along the linear track 50 from a lower position "A" to a higher position "B" which raises the arm 30 to push the cover 20 open. Reversing the direction of travel of the trolley 40 from a higher position "B" to a lower position "A" lowers the arm 30 and closes the cover 20.

The power assisted cover actuator comprises a trolley translating on an inclined linear track carrying an end of the actuator arm provides a relatively simple mechanism allowing for the incorporation of a drive system to provide a power assisted cover actuator. Various types of drive means may be utilized that is suitable for the particular purpose, including, but not limited to electric motor and fluid hydraulic drive systems.

Figure 2:
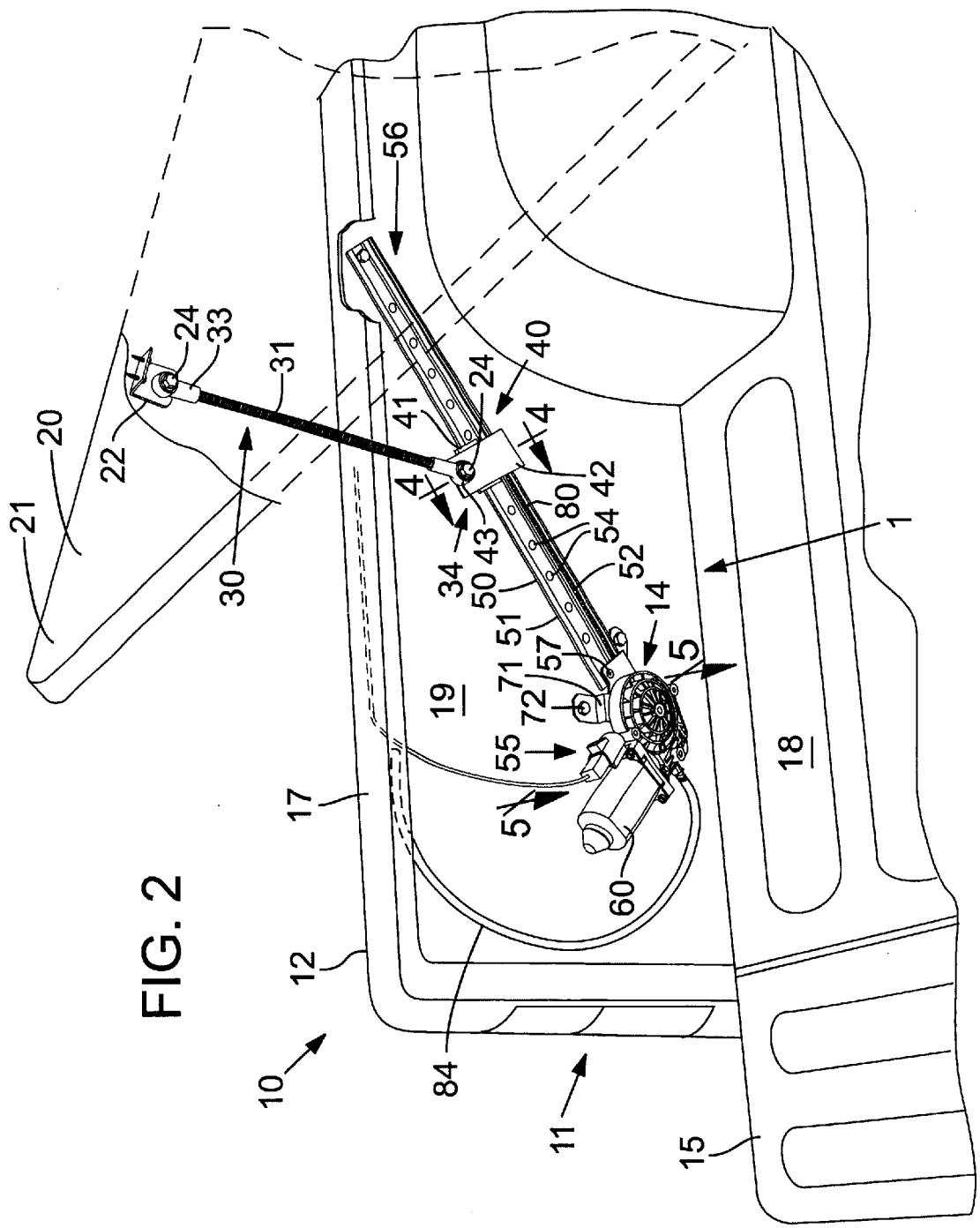
Figure 3:
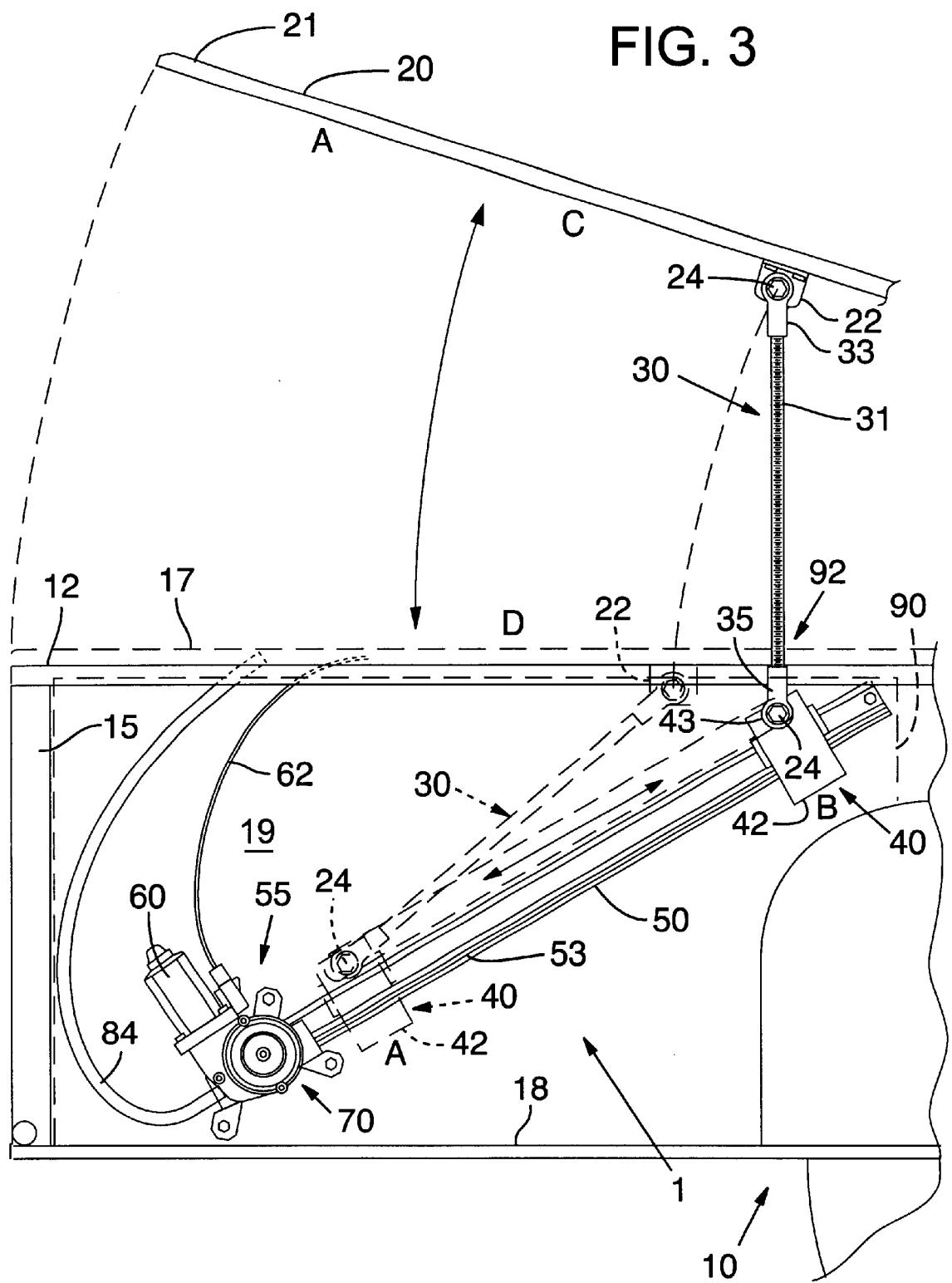
FIG. 3 is a side view of the motor-driven cover actuator in operation in accordance with an embodiment of the invention.

FIGS. 2 & 3 are rear perspective and side views, respectively, of an embodiment of a cover actuator 1 comprising a drive means in the form of an electric motor as mounted in the bed 11 of a pickup truck 10 and coupled to a bed cover 20, in accordance with the present invention. The cover actuator 1 comprises a lift arm 30, a linear track 50, a trolley 40, a drive cable 80, a drive cable sleeve, and a drive motor 60. The linear track 50 guides the movement of a trolley 40. The lift arm 30 is pivotally coupled to the trolley 40 at one end and the cover 20 at the other end. The motor 60 drives the drive cable 80 which is coupled to the trolley 40. The drive cable 80 pushes or pulls the trolley 40 from a lower position "A" adjacent the motor 60 wherein the drive cable 80 is retracted into the drive cable sleeve 84, to an upper position "B" wherein the drive cable 80 is partially withdrawn from the drive cable sleeve 84 and guided along the track 50. The movement of the trolley 42 to an upper position "B" pivotally translates the lift arm 30 raising the cover 20.

The lift arm 30 comprises a linkage rod 31 coupled to an upper coupling member 33 on one end and a lower coupling member 35 on the other end. The coupling members 33, 35 are coupled to the linkage rod 31 in any of a number of suitable methods known, including by threaded coupling, welding and the like. The upper and lower coupling members 33, 35 include a mounting joint adapted to pivot about a bolt 24 passing therethrough and provide some degree of swivel range of motion. Such mounting joints are well known. One example of a suitable joint includes, but is not limited to, a ball captured in a socket, the ball having a through bore to accept a bolt. The ball and socket provides for twisting/swiveling and lateral movement such as to accommodate for slight misalignment between the mounting of the upper coupling member 33 and the mounting of the lower coupling member 35.

FIGS. 4A and 4B are cross-sectional views of the track and trolley, in accordance with an embodiment of the invention. The linear track 50 comprises an elongated channel having a trolley guide flange 51 on one edge and a drive cable flange 52 on the opposite edge. The trolley guide flange 51 is adapted to couple with a trolley guide bearing 41 to provide for secure attachment as well as a guide for linear translational movement of the trolley guide bearing 41. The trolley guide flange 51 provides an L-shaped guide that provides these attributes. Other flange shapes suitable for the particular purpose are anticipated.

The cable guide flange 52 provides a corner support and mounting structure for a semi-circular drive cable guide 53. The drive cable guide 53 provides a protective structure as well as a guide for the movement of the drive cable 80 along the track. The drive cable guide 53 extends substantially the entire distance of the track 50. The exposed portion of the drive cable 80 provided along the length of the drive cable guide 53 provides access by a trolley/cable mount 46 which will be described below.

The trolley 40 comprises a mounting plate 42 and a trolley guide bearing 41. The trolley guide bearing 41 is adapted to couple in sliding engagement with the trolley guide flange 51 as discussed above. The trolley guide flange 51 guides the trolley 40 along the length of the track 50.

The mounting plate 42 is coupled to the trolley guide bearing 41 and provides a mounting platform for the lift arm 30. One or more mounting apertures 43 are provided in the mounting plate 42 such that a suitable fastener may be used to pivotally couple the lower coupling member 35 of the lift arm 30 to the trolley 40, such as, but not limited to, a bolt 24.

The mounting plate 42 further comprises a drive cable mount 46. The drive cable mount 46 is adapted to securely couple with the drive cable 80. The drive cable 80 pushes and pulls the trolley 40 along the track 50 requiring a secure engagement between the trolley 40 and the cable 80. In one embodiment, the drive cable mount 46 is one or more projecting members that couple with and embed into the drive belt 80. Other mounting methods suitable for the particular purpose are anticipated.

Figure 5:
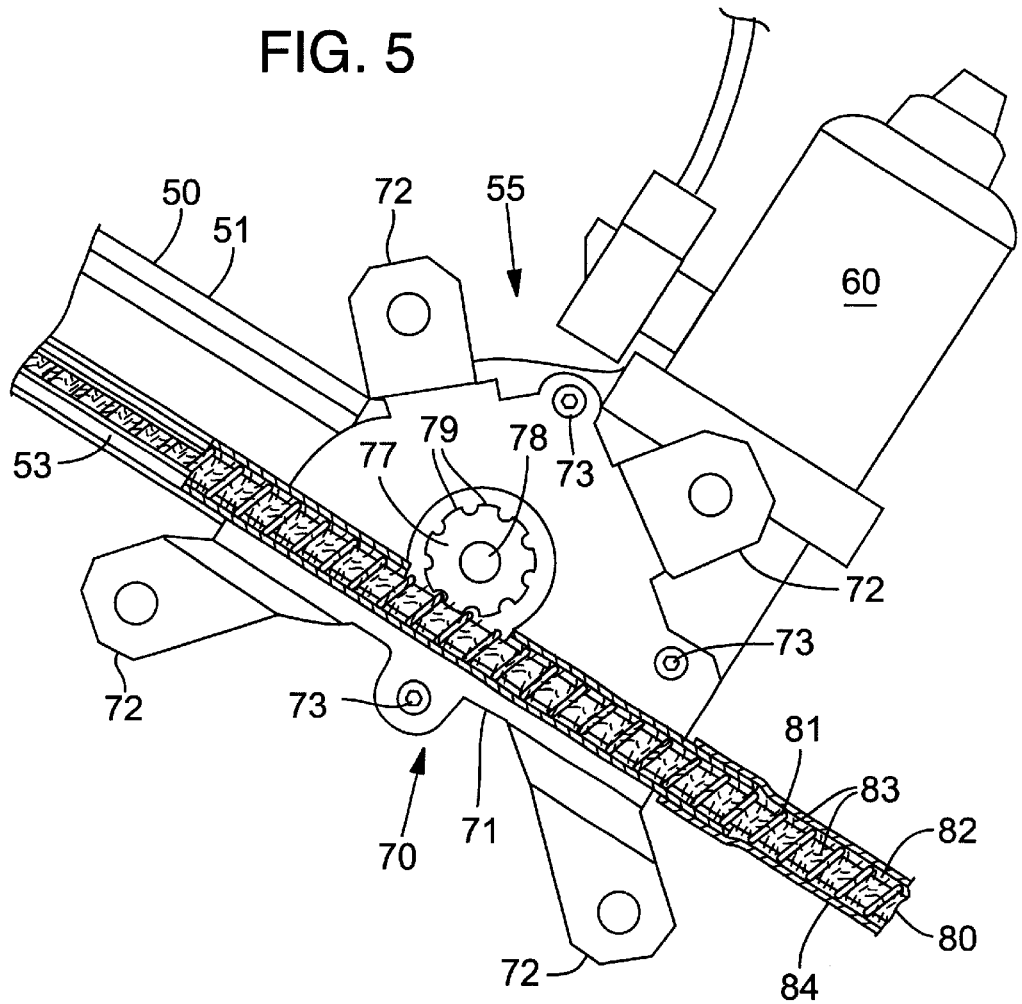
FIG. 5 is a cut-away view of a motor-driven gear and drive cable in accordance with an embodiment of the invention.

FIG. 5 is a cut-away view of a drive means comprising an electric motor 60, a motor-driven gear 77, and drive cable 80 in accordance with an embodiment of the invention. The drive motor 60 is adapted to couple with the drive cable 80 to advance and retract the drive cable 80 along the drive cable guide 53 while carrying the trolley 40 along the trolley guide flange 51. The drive cable 80 must be sufficiently flexible for installation considerations while sufficiently stiff to drive the trolley 40 without kinking or binding. In one embodiment in accordance with the invention, the drive cable 80 comprises a helical coil 81 of stiff wire with a stiffening core 82 covered with bristle 83 inserted therein. The helical coil 81 is not only flexible, but also provides regularly spaced openings for meshing with teeth 79 of the drive gear 77. The bristle 83 extends through the openings of the helical coil 81. The bristle 83 provides a number of beneficial features, such as, but not limited to, keeping dirt and the like from entering the gear 77 and drive cable guide 53, to maintain the spacing between the coils, as well as providing a bearing to center the drive cable 80 along the respective travel paths. The stiffening core 82 adds stiffness to the helical coil 81 preventing compression, collapse, or kinking of the helical coil 81.

It is understood that drive cables and drive means of various configurations will also prove satisfactory for the particular purpose. For example, but not limited thereto, drive cables having threads, teeth, or links are anticipated.

The drive motor 60 is disposed a distal end 55 of the track 50; distal from the hinge coupling 23. The motor 60 is coupled to a toothed gear 77 by a gear drive shaft 78 disposed adjacent the drive cable 80. The trolley 40 is driven back and forth along the track 50 by the gear 77 in meshed engagement with the drive cable 80. The motor 60 rotates the gear 77 in a forward direction advancing the drive cable 80 in a forward direction pushing the trolley 40 forward and away from the motor 60. Reversing the direction of the motor 60 pulls the trolley 40 back towards the motor 60.

The drive cable sleeve 84 is a flexible tubular member with an internal diameter adapted to freely slidingly receive the drive cable 80. The drive cable sleeve 84 is disposed on a structure adjacent the rear of the drive motor 60 along the travel path of the drive cable 80. The drive cable sleeve 84 is adapted to accept the drive cable 80 as it is driven in the reverse direction out of the drive cable guide 53. The drive cable sleeve 84 protects the drive cable 80 from abrasion and dirt, as well as constrains the drive cable 80 to a predetermined path. The drive cable sleeve 84 is adapted to be flexible to conform to installation considerations such as to accommodate tight locations.

The cover actuator 1 is mounted on the inside surface 19 of one of the upright truck body panels 12, 13. The motor 60 further comprises a motor mount plate 73 having mounting flanges 72. Appropriate fasteners are used through apertures in the flange 72 to mount the motor mount plate 71 to the body panel 12, 13. Appropriate fasteners are used through drive mount apertures 73 to couple the motor 60 to the motor mount plate 71. The track 50 further comprises spaced-apart apertures 54 through which appropriate fasteners are used to secure the track 50 to the body panel 12, 13.

The linear track 50 is positioned on the inside surface 19 at an angle to the horizontal extending in an upward direction towards the hinged coupling 23. The angle between the track 50 and the horizontal is provided for the particular purpose of lifting the lift arm 30 as the trolley 40 advances along the track 50. A track angle suitable for the particular purpose includes, but is not limited to, an angle between 15 and 45 degrees. The angle will be determined by many factors, some of which include, but are not limited to, the distance between the cover 20 and the track 50, the distance between the cover actuator 1 and the cover hinge 23, the opening height desired, and the length of the lifting arm 30.

The lift arm 30 is coupled to the trolley 40 using a bolt 24 through the lower coupling member 35 and one of the one or more mounting apertures 43 provided in the mounting plate 42. The cover 20 is provided with a suitable mounting structure on the inside surface of the cover 20 adjacent an edge onto which the upper coupling member 33 is fastened. In one embodiment, the mounting structure is a mounting flange 22 having an aperture to accept a mounting bolt 24 therethrough, as shown in FIG. 3. In one embodiment, the mounting flange 22 comprises an L-shaped bracket fastened by fasteners, adhesive or the like, to the cover 20.

The lift arm 31 is interconnected with the trolley 40 and cover 20 in a manner in which the upper and lower coupling 33, 35 can freely rotate in their mountings during the operation of the cover actuator 1. The coupling 35 must accommodate the rotation experienced when the trolley 40 travels forward to raise the cover 20 or travels rearward to lower the cover 20. Minor misalignment between the upper coupling member 33 and the lower coupling member 35 can be accommodated by the pivot and swivel features of the coupling members 33, 35 as described above. Other joints suitable for the particular purpose are anticipated.

In one embodiment, one cover actuator 1 is mounted on the inside surface 19 of each of opposite truck body panels 12, 13 in parallel relationship. Two cover actuators 1 provide additional support to the cover 20 and prevent any twisting or flexing of the cover 20 possibly experienced by using one cover actuator 1 at one edge of a not particularly rigid cover 20.

The cover 20 includes a hinge coupling 23 proximate the driver's cab 16 of the truck 10. The cover actuator motor 60 is adjacent the tail gate 15 of the truck bed 11, and the lifting arm 30 is positioned along an edge, or inset from an edge of the cover 20 and adapted to clear the rim 17 of the bed 11, by which the cover 20 is pivotally raised above the truck bed 11.

The motor 60 is electrically connected to a common or separate source of electrical power through a switch. For example, in one embodiment, the motor 60 is actuated by a conventional double pole, double throw center-off switch connected to the truck ground and 12V battery voltage. The switch can be located in the truck cab 16 or elsewhere on the truck 10, as well as on a remote-controlled device. The electrical wiring 62 extends from the motor 60 to underneath the upper rim 17 of the bed side 12, 13 and along the rim 17 to the battery under the hood of the truck 10.

The motor 60 is controlled by the electrical switch to turn the gear 77 in a forward direction wherein the gear 77 advances the drive cable 80, and thus the trolley 40, in a forward direction. The trolley 40 carries the lifting arm lower end 34 upward and forward and thereby raises the rear end 21 of the cover 20. The cover 20 is lowered by reversing the motor 60, turning the gear 77 in the reverse direction, retracting the drive cable 80, and thus moving the trolley 40 in a rearward direction. The trolley 40 carries the lifting arm lower end 34 in a downward and rearward direction, thereby lowering the cover 20.

In one embodiment in accordance with the invention, the motor 60 is provided with a mechanical or magnetic clutch to hold the cover open when the power to the motor 60 is removed. In this respect, when the cover 20 is raised by the lifting arm 30 to a partial or fully raised position, the cover 20 will remain in that position. For example, a magnetic clutch in the motor 60 will prevent the cover 20 from moving as a result of the gear 77 remaining in a fixed position upon opening the electrical circuit, and thus holding the drive cable 80 in position. This is an important safety benefit as the cover 20 will not move unless power is provided to the motor 60.

The mechanical or magnetic clutch can also be used to hold the cover 20 closed when the power to the motor 60 is removed when the cover 20 is lowered. This is an important security feature wherein the cover 20 can not be opened unless power is provided to the motor 60.

In one embodiment, the motor 60 and track 50 are protected by a molded plastic or metal shield 90 shown in phantom, in FIG. 3, by dotted line. The shield 90 is attached to the interior of the truck bed floor 18 and the inside surface 19 via flanges (not shown) on the shield 90 using self-tapping fasteners (not shown), such as ½ inch screws, extending through the flanges and the structure of the truck bed floor 18 and inside surface 19. The shield 90 comprises a top aperture 92 to allow the passing of the lifting arm 30 during operation.

It is understood that other drive means can be incorporated in the present invention to provide substantially the same translational movement of the trolley. It is further understood that the drive means can be coupled to the linear track at any location along the track, such as, but not limited to, the proximal end of the track. The above description of an electrically-driven trolley is but one example of many drive means that can be employed for the particular purpose.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A powered tonneau cover actuator for power-assisted opening and closing of a tonneau cover, the tonneau cover covering an area of a vehicle bounded by spaced walls, the walls comprising a front panel, a rear panel opposite the front panel, and parallel side panels, the tonneau cover pivotally coupled at the front panel by a hinge, comprising:

a linear track coupled to the inside surface of a side panel adjacent the rear panel distal to the hinge, the track extending at an upward angle to the horizontal and toward the hinge;

a trolley adapted for sliding engagement with the track and adapted to traverse at least a portion of the length of the track;

a lift arm pivotally coupled to the cover at one end and the trolley at the other end; and a drive means for translating the trolley to and from a lower position distal from the hinge wherein the lift arm closes the cover to a higher position proximal the hinge wherein the lift arm opens the cover.

2. The powered tonneau cover actuator of claim 1, wherein the drive means comprises:

a drive cable coupled to the trolley; and a motor coupled to the track, the motor adapted to engage the drive cable to impart forward and reverse motion thereto from a first position distal to the hinge wherein the cover is lowered, to a second position proximal to the hinge wherein the cover is pivoted about the hinge in an upward direction.

3. The powered tonneau cover actuator of claim 2, ffurther comprising a gear, the motor comprising a drive shaft coupled to the gear, wherein the gear is driven by the motor through the drive shaft, the drive cable comprising a helical coil, wherein the trolley is driven along the track by the engagement of the gear with the openings of the helical coil.

4. The powered tonneau cover actuator of claim 3, further comprising a flexible tubular drive cable cover, the cable cover adapted to receive the drive cable when the drive cable is external to the track.

5. The powered tonneau cover actuator of claim 3, the drive cable further comprising a core insert having bristles, the core insert disposed in the center of the helical coil, the bristles extending through the openings of the helical coil.

6. The powered tonneau cover actuator of claim 1, further comprising a wireless, remotely controlled switch, the switch adapted to operate the tonneau cover actuator.

7. The powered tonneau cover actuator of claim 1, wherein the drive means comprises:

a hydraulic piston, the hydraulic piston coupled to the trolley and adapted to impart forward and reverse motion thereto from a first position distal to the hinge wherein the cover is lowered, to a second position proximal to the hinge wherein the cover is pivoted about the hinge in an upward direction.

8. The powered tonneau cover actuator of claim 1, wherein the linear track extends at an upward angle in the range from 15 to 45 degrees to the horizontal and toward the hinge.

9. The powered tonneau cover actuator of claim 1, wherein the drive means is adapted to hold the cover in position when not in operation, wherein the cover is securely held in the open position and prevented from closing, and wherein the cover is securely held in the closed position and prevented from opening.

* * * * *